April 28, 1936.                S. POND                  2,039,029
                       LAWN EDGE TRIMMER CUTTER
                   Filed April 15, 1935      3 Sheets-Sheet 1

Sheldon Pond
INVENTOR

BY *Victor J. Evans & Co.*
ATTORNEY

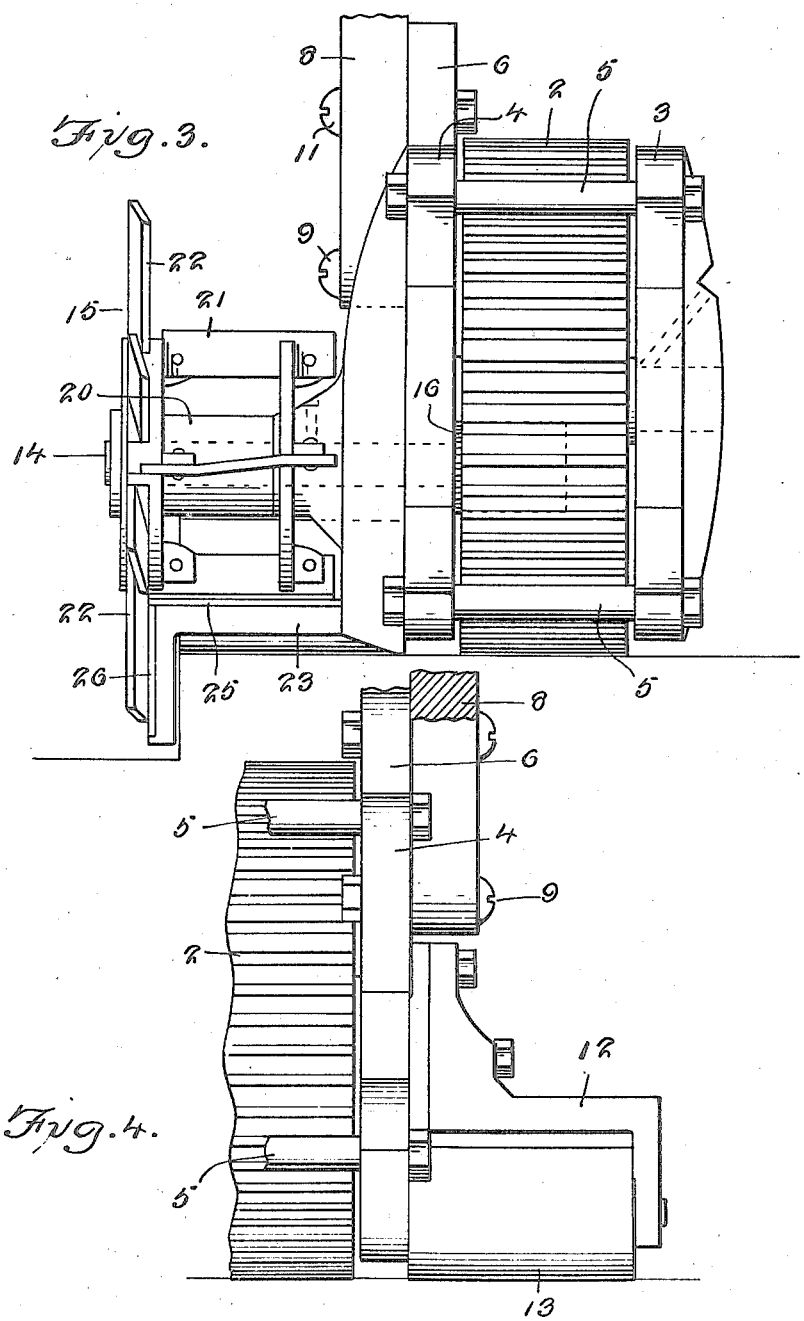

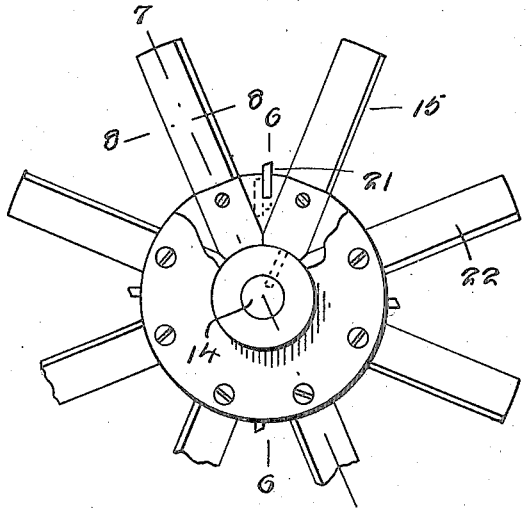
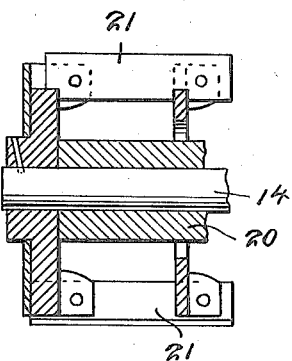
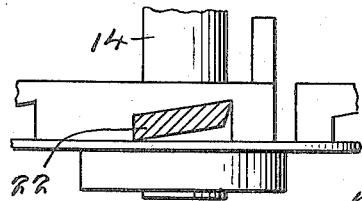
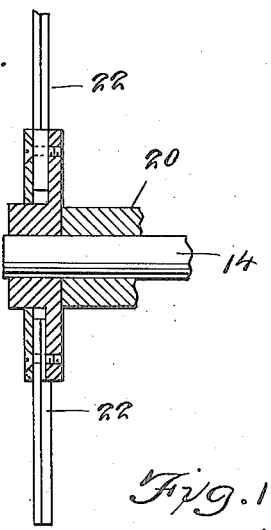
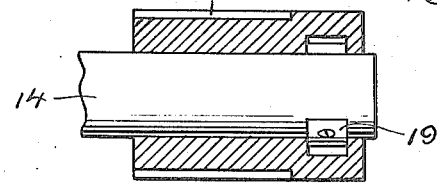
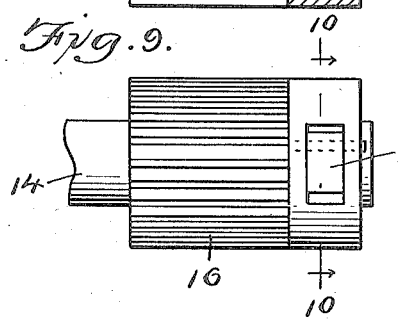
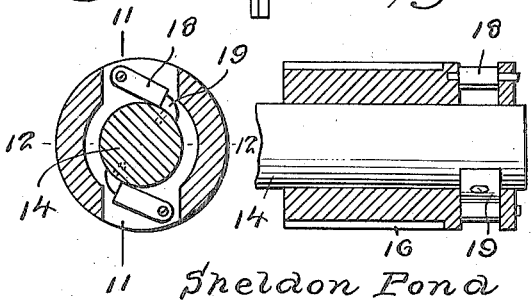
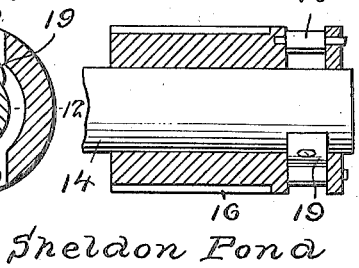

Patented Apr. 28, 1936

2,039,029

UNITED STATES PATENT OFFICE 2,039,029

LAWN EDGE TRIMMER CUTTER

Sheldon Pond, Taunton, Mass.

Application April 15, 1935, Serial No. 16,474

1 Claim. (Cl. 56—251)

This invention relates to lawn border and edge trimmers, and has for the primary object the provision of a device which may be easily propelled manually over a lawn to trim the latter at its edges and adjacent thereto in a single cutting operation so as to obviate the use of hand shears and lawn mowers which have been proven impractical for such work.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a fragmentary side elevation illustrating a lawn border and edge trimmer constructed in accordance with my invention.

Figure 3 is a fragmentary front elevation illustrating the device.

Figure 4 is a fragmentary rear elevation illustrating the device.

Figure 5 is a fragmentary plan view illustrating the radially arranged cutting blades.

Figure 6 is a detail sectional view taken on the line 6—6 of Figure 5.

Figure 7 is a sectional view taken on the line 7—7 of Figure 5.

Figure 8 is a detail sectional view taken on the line 8—8 of Figure 5.

Figure 9 is a fragmentary plan view illustrating a combined drive pinion and ratchet.

Figure 10 is a sectional view taken on the line 10—10 of Figure 9.

Figure 11 is a sectional view taken on the line 11—11 of Figure 10.

Figure 12 is a sectional view taken on the line 12—12 of Figure 10.

Figure 1:
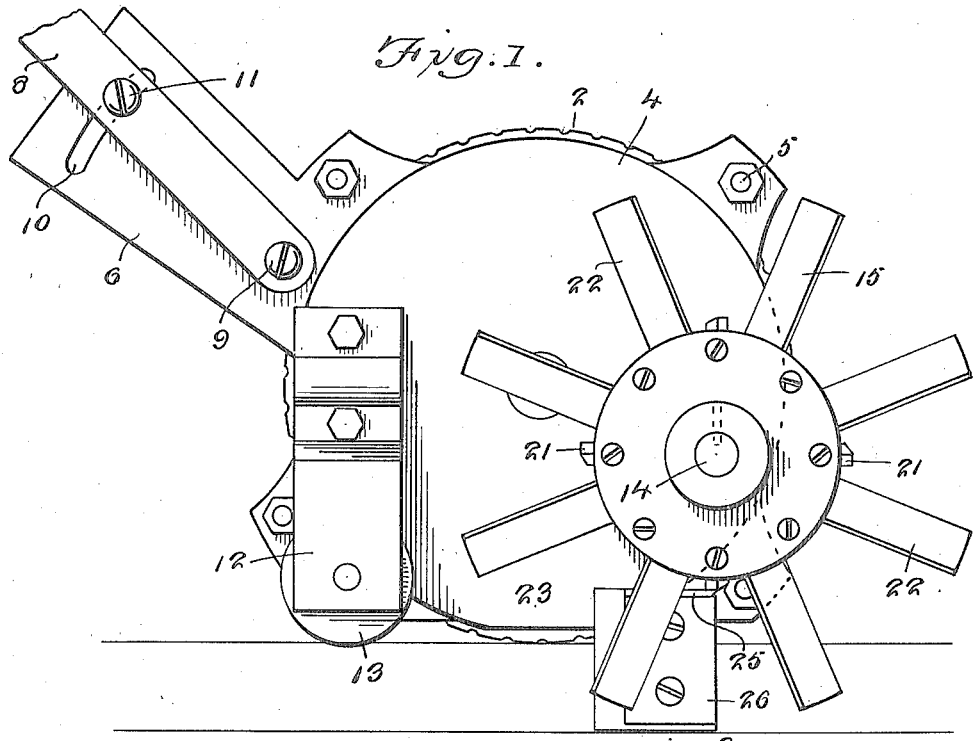
Figure 2:
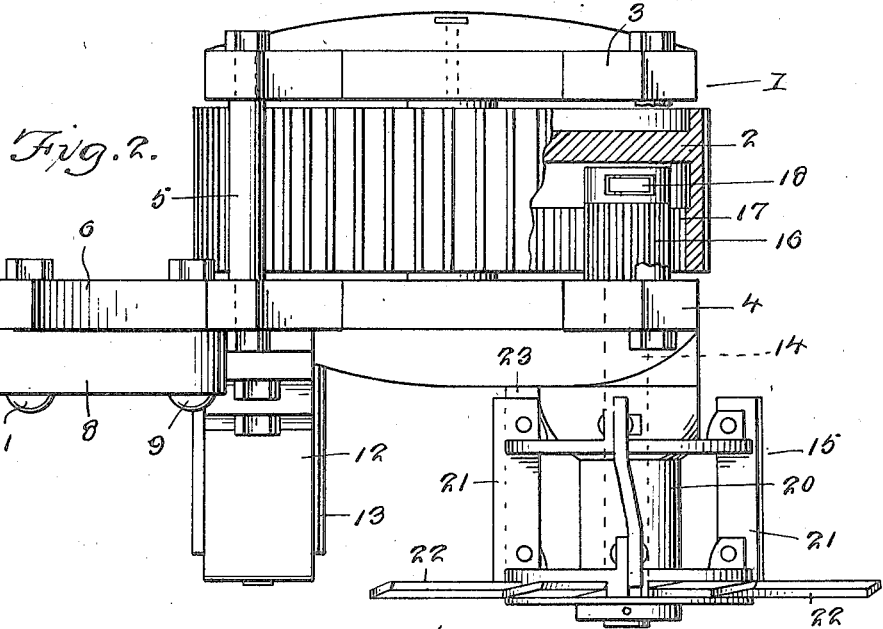
Figure 2 is a fragmentary plan view, partly in section, illustrating the same.

Referring in detail to the drawings, the numeral 1 indicates a mounting for a ground or bull wheel 2 and consists of end plates 3 and 4 connected by tie bolts 5. The wheel 2 is suitably journaled to the end plates and the bearings for said wheel may be lubricated in any convenient manner. Formed integrally with the plate 4 is an extension 6 to which a handle 8 is pivoted, as shown at 9. The extension 6 is provided with a slot 10 to receive an adjusting bolt 11 carried by the handle whereby the latter's inclination may be varied.

A bracket 12 is carried by the plate 4 adjacent the extension and has journaled thereto a roller 13 adapted to steady the device when moving over a surface and also to follow the path of the cutting mechanism.

Journaled to the plate 4 is a shaft 14 and a portion of the latter is arranged in advance of the roller 13 and has secured thereto the cutting mechanism 15. A portion of the shaft located at the opposite side of the plate 4 from the cutting mechanism extends into the bull or ground wheel 2 and has journaled thereon a pinion 16 which meshes with a ring gear 17 formed integrally with the wheel 2. The pinion 16 carries pivoted dogs 18 adapted to engage lugs 19 on the shaft 14 for the purpose of rotating the shaft when the device is propelled forwardly over the ground but which will permit the shaft 14 to idle when the device is moved rearwardly over the ground.

The cutting mechanism 15 consists of a hub 20 suitably secured to the shaft 14 and has mounted thereon horizontally disposed blades 21 and also secured to the outer end of the hub is a series of radially arranged blades 22. An L-shaped bracket 23 is carried by the plate 4 to which horizontally and vertically arranged knives 25 and 26 are secured. The blades 22 have a desired pitch so as to cooperate with the knife 26 in severing grass at the edge of a border while the horizontally disposed blades cooperate with the knife 25 in the border. A device of this character will efficiently trim a lawn at its border and edge with minimum effort on the part of the operator.

While I have shown and described the preferred embodiment of my invention, it will be understood that minor changes in construction, combination and arrangement of parts may be made without departing from the spirit and scope of my invention, as claimed.

Having described the invention, I claim:

A lawn cutter comprising a mounting including spaced connected end plates, a bull wheel arranged between said end plates, means journaling said bull wheel to the end plates, a handle secured to one of said end plates, a shaft journaled to said last-named end plate and located at an opposite side thereof from said bull wheel, ratchet means connecting the shaft and bull wheel, a reel secured to said shaft and including a hub and, horizonally disposed cutter blades and radially arranged cutter blades secured to said hub with said horizontally disposed blades arranged between the radially disposed blades and the last-named end plate, an L-shaped bracket secured to said last-named end plate, vertical and horizontal knives secured to said bracket for cooperation with the cutter blades, and a roller journaled to said last-named end plate and paralleling the horizontal knife and cooperating with the bull wheel in supporting the mounting.

SHELDON POND.